United States Patent Office 3,214,294
Patented Oct. 26, 1965

3,214,294
PROCESS FOR PREPARING CARAMEL COLOR
Harry Meisel, Englewood, N.J., assignor to Corn Products Company, New York, N.Y., a corporation of Delaware
No Drawing. Filed June 17, 1963, Ser. No. 288,482
10 Claims. (Cl. 127—34)

This invention relates to an improved process for preparing caramel color whereby the preparation can be carried out in a continuous manner.

Caramel colorings are made by heat treatment of carbohydrates, such as sugars, generally in the presence of certain reagents selected to create a reaction environment favorable to the development of certain characteristics in the finished product.

There are several types of caramel color, e.g., non-acid resistant and acid resistant types for soft drinks, for malt and spirit beverages, baked goods and for food colorings. The characteristics of caramel colors depend to some degree upon whether or not reagents are used to assist caramelization of the carbohydrates, and, if so, the type of reagent. A wide variety of reagents are used to assist caramelization, e.g., sulfuric, sulfurous, phosphoric, citric, acetic and carbonic acids; the ammonium, sodium and potassium salts of carbonic, phosphoric, sulfuric and sulfurous acids; and the ammonium, sodium and potassium hydroxides.

Heretofore, caramel colors have been produced by batch processes, which in addition to being cumbersome have other disadvantages. One of the main disadvantages is the time required to complete the entire process, which comprises heating a sugar liquor, with addition of a reagent to promote caramelization, to the maximum temperature useful in caramelization, maintaining this temperature until the desired tinctorial power is attained and then cooling the resultant caramel color. When, for example, a 2840 liter capacity pressure cooker is used in the preparation of a 1893 liter batch of caramel color, at least one hour and sometimes longer is required to raise the temperature to the range generally used for caramelization, e.g., about 120° C. to about 150° C. The time required for caramelization may vary from 3 to 7 hours depending upon the quality of caramel color desired. When an open type kettle is used the time may be longer. Accordingly, the number of batches and thus total production per day is limited. The formation of color bodies is accompanied by a rapid and violent evolution of heat, hence it is difficult to control the temperature if it rises above about 140° C., that is, to prevent it from rising to the point where there is overcooking or even complete destruction of the caramel color. Once a certain temperature above about 140° C., is reached, it is difficult to shut off the heat in time to prevent further rapid rise of temperature. A batch of potentially satisfactory caramel color could be ruined easily within a short time of the desired end point. Hence, most operators, in order to avoid this operational difficulty, prefer to carry out the caramelization at the lowest possible temperature. This, in turn, results in prolonged cooking times requiring the operator's close attention, and still does not relieve him of the responosibility for maintaining the proper temperature. Moreover, in some processes the operator has the additional responsibility of adding the reagent at the proper time.

The batch process also has the disadvantage that the quality of the caramel color varies from batch to batch depending upon the skill of the operator or operators and the type of equipment including controls.

Obviously the large number of cookers necessary to carry out large scale production of caramel color requires considerable capital investment, floor space, and high maintenance costs of the equipment.

It is obvious from the above that there is a necessity for a more efficient, simple, and economical method of producing caramel color.

The main object of the present invention is to provide a continuous process which will produce caramel color in a very short time as compared to prior art processes. A further object is to provide a continuous process for making caramel color which is simple and can be readily controlled. A further object is to provide a process which produces a more uniform product of higher quality. Other objects will appear hereinafter.

I have found that I can obviate the problems of the prior art by the use of a continuous process, operated under certain specific conditions, which is rapid and easily controlled. It was quite surprising to find that the time for the caramelization to take place, i.e., the time to develop the desired tinctorial power, is reduced to periods as short as 1 to 10 minutes, since it has always been customary to "hold" the sugar liquor, or maintain the temperature thereof, at the so-called caramelization temperature for at least several hours.

My invention is applicable in the preparation of all types of caramel color from various food grade carbohydrates, e.g., starch hydrolyzates, sucrose, dextrose, invert sugar, molasses, malt syrup, lactose and the like. Starch hydrolyzate liquors having a dextrose equivalent value (D.E.) of about 40 to 100 percent are particularly useful in the present invention as illustrated hereinafter. In carrying out the invention it is generally advisable to use aqueous liquors of the carbohydrates in as high a concentration as possible to avoid excessive evaporation. A practical operating range of concentration of carbohydrates is about 15° Baumé to about 46° Baumé.

The present invention provides a continuous process for preparing caramel color from an aqueous carbohydrate liquor, wherein the aqueous carbohydrate liquor is continuously subjected to heat treatment under pressure with agitation. The heat treatment raises the temperature of the carbohydrate liquor to caramelization temperature in a short period of time. The carbohydrate liquor is maintained at the caramelization temperature until the desired degree of caramelization is attained. In one embodiment of the present invention, an aqueous carbohydrate liquor is continuously introduced under pressure into a heat exchanger equipped with heating means and scraping means whereby maximum heat transfer efficiency is provided and the carbohydrate liquor is agitated. Thereby the temperature of the carbohydrate liquor is raised to the caramelization temperature in less than about one minute. The carbohydrate liquor is then maintained at the caramelization temperature with agitation for between about 1 and about 10 minutes until the desired degree of caramelization is reached. The resultant caramel color is thereafter cooled. If desired, a reagent, which may be used to assist caramelization is admixed with the carbohydrate liquor prior to the subjection to the heat treatment.

The heat exchangers used for the heating should preferably be of the wiped film or scraped-shell type. Various types of the wiped film heat exchangers are available. One type, which is satisfactory for purposes of my invention, consists essentially of a jacketed tube of large diameter equipped with scrapers rotating at high speed. This construction leaves only a narrow annular space through which the material being processed passes rapidly resulting in rapid heating or cooling, as in the case may be. A more detailed description appears in the following U.S. patents which are incorporated herein by reference:

Re. 21,406, 22,519, 1,783,865, 1,783,866, 1,783,867, 1,847,149, 1,940,473, 1,962,386, 1,972,253, 2,063,065, 2,219,656. Such heat exchangers are provided with scraping means whereby the surfaces of the inside thereof are wiped continuously to provide high turbulence of the material at the surfaces, resulting in efficient heating of the material passing therethrough. Single or multiple units may be used, i.e., the temperature of the sugar liquor may be raised to a specified degree in one heat exchanger, then passed through one or more additional heat exchangers to raise it to and maintain it at the temperature necessary for caramelization. A single heat exchanger may also be used for both the preheating and caramelization. Any heat transfer equipment which can provide high turbulence and can also heat the supply liquor to the required temperature in substantially the same time as the aforementioned equipment is satisfactory.

The reactor wherein the caramelization is effected may be any container, e.g., tubular or pressure vessel properly insulated so the desired temperature may be maintained, and preferably equipped with means for agitating the sugar liquor therein. Means for agitation in a tubular reactor may not be necessary if the proper flow conditions are maintained. A wiped film heat exchanger, or other type as described above, may also be used as the reactor.

Cooling the caramel color may be done with the same type of heat exchanger as described above or by any conventional means, such as flashing.

A pilot-scale installation used with satisfactory results in the preparation of caramel color, in accordance with the principles of my invention, comprises two wiped film heat exchangers, a reactor and auxiliary equipment set up, and connected to each other in the sequence set forth below:

(1) Supply tank equipped with agitator to mix sugar liquor and catalyst, and with outlet pipe and valve at bottom.

(2) Positive displacement diaphragm pump with variable stroke providing flow rates up to 248 liters per minute, equipped with connecting pipes and valves.

(3) No. 1 heat exchanger (wiped film) of the type heretofore described, 30.48 cm., shaft 2.85 cm. in diameter, space including shaft 3.81 cm. in diameter, capacity 161 cc., heating surface of 368 sq. cm., and variable rotor speeds. An r.p.m. of 347 was used in the experiments. The heat exchanger was equipped with a pressure gauge, thermometer, connecting pipes and valves and was heated either by supplying steam under pressure to the jacket or by oil. The heat exchanger was also equipped with a 2 H.P. motor running at 1800 r.p.m. and with a transmission to give various speeds as indicated above.

(4) No. 2 heat exchanger same as No. 1. The two heat exchangers were connected with an insulated pipe having an overall length of 449 cm. and a diameter of 1.27 cm. The volume of the product in the connecting pipe was 569 cc. A shorter connecting pipe is preferred but was not used in the arrangement described because of the presence of other equipment.

(5) Reactor unit consisting of a stainless steel pipe having an overall length of 45.09 cm. and an internal diameter of 10.26 cm. equipped with a shaft 2.54 cm. in diameter with pins, revolving in the plane normal to the direction of flow, to provide agitation. The pipe was insulated to prevent loss of heat so that caramelization could take place within a specified time. The volume of tht product inside the reactor was 3503 cc.

(6) A coil made of a 9.14 meter length of stainless steel pipe 1.27 cm. in diameter inserted in a drum was used as a cooling unit.

(7) Adjustable back-pressure control system such as a spring-loaded screw device to control the internal pressure in the system to prevent flashing of the liquor therein.

(8) Product discharge pipe to transfer the caramel color to receiving containers.

(9) Alternative product discharge pipe to permit recycle back to supply tank.

(10) Connecting pipes, unless otherwise specified, were 1.27 cm. in diameter, of stainless steel.

In carrying out my invention, for example, a food grade starch hydrolyzate liquor having a D.E. value of about 78 percent and a density of 43° Bé. was thoroughly mixed in the supply tank with an ammonium bissulfite reagent, such as is used in the presently commercial batch type of process for making caramel color. The supply pump fed the supply liquor into the No. 1 heat exchanger and to the subsequent units in the system. Steam was supplied to the jacket of the heat exchangers under pressures ranging from 9.84 to 11.60 kg./sq. cm. The rotors were operated at a fixed speed of 347 r.p.m. At the beginning of a run, it was desirable to keep the temperature of the liquor in the system somewhat below the maximum temperature used for caramelization and recycle the liquor until proper conditions of flow rate, and holding times could be estimated, and then adjust the temperature to the desired range. This same procedure was used after the system had been shut down and the equipment washed. The internal pressure in the system must be kept sufficiently high to prevent flashing of the liquor in the system at its maximum temperature. This was done by means of the spring-loaded screw device aforementioned. After the caramel color was cooled, it was stored in suitable containers.

Various runs were made in the equipment described above under various conditions. Table I sets forth the operating conditions for several typical runs. Table II sets forth analyses of the products resulting from some of the runs.

*Table 1*

| Run No. | Minutes of Run | Flow-Rate, liters/hr. | Temperature ° C. Heat Exchangers | Pressures, kg./sq. cm. | Heating Medium | Dwell Time in Reactor | Comments |
|---|---|---|---|---|---|---|---|
| 8 | 40 | 60.56 | #1 152° C<br>#2 179° C | 6.33–11.60 | Steam | 5 min | Recycling discontinued after desired color was obtained. |
| 9 | 35 | 60.56 | #1 154–163° C<br>#2 179–182° C | 12–13 | do | 5 min | Do. |
| 15* | 15 | 52.61 | #2 185–189° C | 7–13.4 | Oil | 4 min. 30 sec | Do. |
| 15a* | 15 | 37.85 | #2 170–182° C | 10–13.4 | do | 5 min. 40 sec | Do. |
| 16 | | 49.20 | #2 182° C | 14 | do | 5 min | Do. |

*Temperature in #1 heat exchanger not recorded.

Table II.—Analyses

| | Product from Run No. 8 | Product from Run No. 9 | Run No. 15 | Run No. 15(a) | Run No. 16 | Commercial Caramel Color Type A | Commercial Caramel Color Type B |
|---|---|---|---|---|---|---|---|
| Baumé | 35.8 (comm.) | 37.1 (comm.) | 34.4 at 20° C | 34.8 at 20° C | 34.7 at 20° C | 36.6-37.4 (comm.) | 33.7-34.7 (comm.). |
| Spencer Color | 196 | 200 | 158 | 164 | 174 | 184-206 | 167-159. |
| pH | 3.0 | 3.1 | 3.1 | 3.0 | 3.0 | 3.0 | 2.8-3.2. |
| Viscosity, cps. at 20° C. | 172 | 244 | 90 | 98 | 102 | 300-500 | 120-170. |
| HCl, acid stability: | | | | | | | |
| 10 min | | Clear 72 hrs | Clear 72 hrs | Clear 72 hrs | | Clear 72 hrs | Clear 72 hrs. |
| 30 min | | do | do | do | | do | Do. |
| Haze, min | 75 | 90 | 170 | 175 | 145 | 50-75 | 125-150. |
| Gel, min | 103 | 120 | 230 | 230 | 205 | 60-100 | 200-255. |
| Resinification, hrs. at 100° C. | 24 | 40 | 44 | 44 | 54 | 18-22 | 65-78. |

NOTE.—The same type and amount of reagent was used in Run No. 9 as in Commercial Caramel Color Type A. The same type and amount of reagent was used in the remaining runs as in Commercial Caramel Color Type B.

The flow rate of the supply liquors through the system could be varied from 0 to about 246 liters/hour by controlling the pump setting. The percentage of flow varied from about 15 to about 25 for the runs described above.

Sucrose liquors are also particularly useful in the preparation of caramel color, e.g., at a concentration of about 35° Bé. to about 44° Bé., about 39° Bé. generally being preferred. In the batch method a caramelization temperature of about 132-135° C. is used when ammonium bisulfite is used as the reagent. When sucrose e.g. liquor about 39° Bé., is used in making caramel color in accordance with the principles of my invention with the same ratio of sucrose to reagent as presently employed in batch cooking operations but using caramelization temperatures of 179-188° C. for about 5 minutes, caramel color similar in quality to that presently commercially available is produced. The analysis of a typical caramel color from sucrose is given below:

| | |
|---|---|
| Bé. @ 20° C. | 33.8° |
| Spencer color | 164 |
| pH | 2.8 |
| Resinification, hrs. | 60 |
| HCl acid test 10 min., clear hrs. | 72 |
| Haze, min. | 105 |
| Gel, min. | 130 |
| Viscosity, cps. @ 20° C. | 68 |

Although I have described my invention with reference to two carbohydrate materials it is applicable to all those which are capable of caramelizing with or without the assistance of the reagents known to be useful in making caramel color. The novel aspect of my invention lies in the discovery that caramelization of carbohydrates can be carried out on a continuous basis in a surprisingly short time. In addition, is is possible to use higher temperatures for the caramelization than in batch operations for the same amount of reagent. As the amount of reagent is decreased, the temperature may be increased. When no reagent is used, it is possible to carry out the caramelization at temperatures approaching the decomposition temperatures of the carbohydrates, e.g. about 185 to about 200° C.

I claim:

1. In a process for preparing caramel color, wherein a carbohydrate liquor consisting essentially of a food grade carbohydrate material selected from the group consisting of starch hydrolyzates, sucrose, dextrose, invert sugar, molasses, malt syrup and lactose is heated at a temperature sufficient to produce caramelization of said carbohydrate liquor, the improvement which comprises continuously introducing said carbohydrate liquor under pressure into a heat exchanger whereby the temperature of said liquor is rapidly raised to caramelization temperature, maintaining all of said liquor at said caramelization temperature with agitation for a sufficient period of time to obtain the desired degree of caramelzation, and thereafter cooling the resultant caramel color, said heat exchanger comprising an elongated narrow annular space through which all of said carbohydrate liquor passes rapidly and including an interior surface, said heat exchanger being equipped with heating means, said heating means providing maximum heat transfer efficiency from the outside of the wall which provides said interior surface to said interior surface, and a scraping means, said scraping means extending transversely entirely across said annular space in which said carbohydrate liquor is confined and said scraping means wiping said interior surface of the heat exchanger thereby providing continual agitation of the material passing therethrough.

2. A process according to claim 1 wherein a reagent is used to assist caramelization.

3. A process as in claim 1 wherein said caramelization temperature is reached in less than about 1 minute.

4. A process as in claim 1 wherein said carbohydrate liquor is maintained at said caramelization temperature for a period of time between about 1 and about 10 minutes.

5. Process as in claim 1 wheren said caramelization temperature is in the range of between about 170° C. and about 185-200° C.

6. A process for the preparation of caramel color which comprises admixing a food grade starch hydrolyzate liquor consisting essentially of a food grade starch hydrolyzate material, said liquor having a D.E. value of about 40 to about 100% and a density of about 15° to about 46° Baumé with an ammonium bisulfite reagent, introducing the resultant mixture under pressure into a heat exchanger, said heat exchanger comprising an elongated narrow annular space through which all of said mixture passes rapidly and including an interior surface, said heat exchanger being equipped with heating means, said heating means providing maximum heat transfer efficiency from the outside of the wall which provides said interior surface to said interior surface, and a scraping means, said scraping means extending transversely entirely across said annular space in which said mixture is confined and said scraping means wiping said interior surface of the heat exchanger thereby providing continual agitation of the material passing therethrough, wherein said mixture attains a temperature between about 170 and about 190° C. in less than about 1 minute, maintaining the liquor at caramelization temperature for a period of between about 1 and about 10 minutes, and cooling the resultant caramel color.

7. A process as in claim 6 wherein said caramelization temperature is in the range of between about 170° C. and about 185-200° C.

8. A process as in claim 6 wherein said starch hydrolyzate liquor has a D.E. value of about 78% and a density of about 46° Baumé and is maintained at caramelization temperature for about 5 minutes.

9. A process for the preparation of caramel color which comprises admixing a sucrose liquor consisting essentially of sucrose, said liquor having a density of about 35° to about 44° Baumé with an ammonium bisulfite reagent, introducing the resultant mixture under pressure into a heat exchanger, said heat exchanger comprising an elongated narrow annular space through which all of said mixture passes rapidly and including an interior surface, said heat exchanger being equipped with heating means, said heating means providing maximum heat transfer efficiency from the outside of the wall which provides said interior surface to said interior surface, and a scraping means, said scraping means extending transversely entirely across said annular space in which said mixture is confined and said scaping means wiping said interior surface of the heat exchanger thereby providing continual agitation of the material passing therethrough, wherein said mixture attains a temperature between about 179° C. and about 188° C. in less than about 1 minute, maintaining the liquor at caramelization temperature for a period of between about 1 and about 10 minutes, and cooling the resultant caramel color.

10. A process as in claim 9 wherein said sucrose liquor has a density of about 39° Baumé and is maintained at caramelization temperature for about 5 minutes.

References Cited by the Examiner
UNITED STATES PATENTS

| 2,582,261 | 1/52 | Longenecker | 127—34 |
| 2,767,108 | 10/56 | Fetzer | 127—34 |
| 2,835,589 | 5/58 | Whitefield | 99—134 |

OTHER REFERENCES

Jacobs: Preparation of Caramel, American Perfumer, vol. 49, May 1947, pp. 501, 503 and 505.

MORRIS O. WOLK, *Primary Examiner.*